United States Patent [19]

Palmer et al.

[11] 4,424,196
[45] * Jan. 3, 1984

[54] PHOSPHOHEMIHYDRATE PROCESS FOR PURIFICATION OF GYPSUM

[75] Inventors: Jay W. Palmer, Lutz, Fla.; John C. Gaynor, Des Plaines, Ill.

[73] Assignee: United States Gypsum Company, Chicago, Ill.

[*] Notice: The portion of the term of this patent subsequent to Jun. 14, 2000, has been disclaimed.

[21] Appl. No.: 393,232

[22] Filed: Jun. 29, 1982

[51] Int. Cl.$^3$ .................. C01F 11/46; C01F 13/00; C01B 25/16; G21F 9/28

[52] U.S. Cl. .................. 423/166; 423/2; 423/11; 423/167; 423/319; 423/321 R; 423/555; 423/18; 423/20; 106/110

[58] Field of Search .................. 106/109, 110; 423/2, 423/3, 18, 11, 20, 166, 167, 319, 321 R, 555, 170, 171, 172

[56] References Cited

U.S. PATENT DOCUMENTS

| | | | |
|---|---|---|---|
| 3,951,675 | 4/1976 | Krempff | 423/555 X |
| 4,146,568 | 3/1979 | Lange, Jr. | 423/2 X |
| 4,282,192 | 8/1981 | Larson | 423/2 X |
| 4,311,677 | 1/1982 | Gerunda et al. | 423/11 X |

FOREIGN PATENT DOCUMENTS

| | | | |
|---|---|---|---|
| 3037368 | 7/1981 | Fed. Rep. of Germany | 423/18 |
| 55-144419 | 11/1980 | Japan | 423/10 |
| 1394734 | 5/1975 | United Kingdom | 423/555 |

Primary Examiner—Benjamin R. Padgett
Assistant Examiner—Matthew A. Thexton
Attorney, Agent, or Firm—Kenneth E. Roberts; Robert H. Robinson; Samuel Kurlandsky

[57] ABSTRACT

A wet process for producing phosphoric acid and phosphohemihydrate by acidulation of phosphate rock. A strong phosphoric acid is obtained with concomitant production of an improved calcium sulfate that is extremely low in radioactivity by operation in Region II for shorter time so as to produce small sized hemihydrate particles, then hydration of a substantial proportion but less than all of the hemihydrate to coarse gypsum substantially free of radioactivity in a dilute acidic aqueous slurry at a temperature and P$_2$O$_5$ concentration selected so as to be within Region I of FIG. 1 and having a substantial weight proportion of coarser gypsum particles that are substantially free of radioactivity.

20 Claims, 7 Drawing Figures

STABILITY DIAGRAM – CaSO$_4$ IN CaSO$_4$·H$_3$PO$_4$·H$_2$O SYSTEM

STABILITY DIAGRAM — $CaSO_4$ IN $CaSO_4 \cdot H_3PO_4 \cdot H_2O$ SYSTEM

Fig. 1

Fig. 2
Nissan Hemihydrate Process
Modified For Purified Gypsum

Fig. 3
Prayon Process Modified For Purified Gypsum

PHOSPHOHEMIHYDRATE PROCESS FOR PURIFICATION OF GYPSUM

BACKGROUND OF THE INVENTION

1. Field of the Invention

The present invention relates to the production of phosphoric acid, and more particularly, refers to an improved wet process for converting phosphate rock into a concentrated phosphoric acid with concomitant production of an improved calcium sulfate.

In conventional wet methods of producing phosphoric acid, finely divided phosphate rock is digested with mixtures of phosphoric acid, sulfuric acid and water causing a reaction between the calcium phosphate in the rock and the acid to produce phosphoric acid and a precipitate of calcium sulfate. Most wet processes are directed to producing the calcium sulfate product in the dihydrate form, or phosphogypsum. In recent years, interest has increased in the hemihydrate, or hemihydrate-dihydrate processes, because of potential for higher overall recovery of $P_2O_5$ and refinements for a by-product calcium sulfate of particle sizes and qualities more useful for use in making gypsum plaster, gypsum wallboard and use as a setting moderator for Portland cement.

These modified processes differ from the more conventional dihydrate processes in that the calcium sulfate is first formed as the hemihydrate during decomposition of the phosphate rock at elevated temperatures (90°–100° C. in the Mitsubishi process and 80°–110° C. in the Nissan process). The hemihydrate is obtained as large coarse crystals and then recrystallized to dihydrate in separate reaction vessels to allow optimum process control. In the recrystallization, or hydration sections, the slurry of metastable hemihydrate is cooled to induce crystallization of the dihydrate, mixed with cooled, recycled dihydrate slurry from the last tank of the hydration section to provide fine gypsum seed crystals and to maintain uniform calcium ion concentration in the slurry. Under these conditions, solubility of the hemihydrate rises rapidly, and the calcium sulfate recrystallizes as dihydrate on the surface of the dihydrate seed crystals present, while a part of the dissolved hemihydrate forms new dihydrate nucleii from the supersaturated solution. The slurry is finally cooled to 50° C. or lower, and fully hydrated gypsum crystals are separated. The resulting dihydrate crystals, in comparison to those of the usual dihydrate processes, are larger and thus more readily filtered, retain less $P_2O_5$ in the crystal lattice and have lower contents of some other impurities. It is believed that about 25 picoCuries per gram of calcium sulfate (25 pCi/g) of radium-226 remain in the calcium sulfate from these processes. Typical phosphogypsum from the Prayon and modified Prayon dihydrate processes also contain about 25 pCi/g of radium-226. These contaminations have become of increasing concern.

2. Description of the Prior Art

Prior attempts for reducing radioactivity of calcium sulfate from the wet process production of phosphoric acid have focused upon treatment of phosphogypsum obtained from the Prayon and modified Prayon processes. U.S. Pat. No. 4,146,468 discloses a process for reducing radioactive contamination of phosphogypsum by slurrying it with a dilute sulfuric acid containing barium sulfate and separating the solids resultant therefrom into fine and coarse fractions. It discloses that the fine fraction predominates in the radioactive contamination. It does not describe how much radioactivity may be removed in the coarser fractions, and there is no disclosure of how much of the starting phosphogypsum is recoverable, but losses could be considerable. U.S. Pat. Nos. 3,949,047 and 4,282,192 disclose treatment of the monocalcium phosphate solution prior to precipitation of the calcium sulfate. In the former patent, the solution is treated by addition of barium compounds to reduce radium contamination; and in the latter patent, the solution is treated with a sequestering agent, and a first phosphogypsum precipitate high in radium is discarded.

There is still a need in the art for effective and economical means for removing substantial portions of the radium that originates in the phosphate rock. There is a need in the art for making calcium sulfate products that have acceptable levels of radium such that they may be utilized in gypsum wallboard and other industrial and construction materials. In addition, there is a need to provide improved processes for obtaining higher $P_2O_5$ content phosphoric acid products; and further, to provide processes which convert previous "waste" calcium sulfate by-products into material acceptable for commercial utilization.

SUMMARY OF THE INVENTION

It is an object and advantage of the present invention to provide a process for providing a calcium sulfate product of greatly reduced radium-226 levels. Another object and advantage is the production of a phosphocalcium sulfate dihydrate which may be converted to gypsum products useful in the construction and bulding materials industry. Still another object is to provide a process for economically and efficiently producing increased yields of strong phosphoric acid. Strong phosphoric acid is defined as phosphoric acid of at least about 35% $P_2O_5$ (48% $H_3PO_4$).

Figure 1:
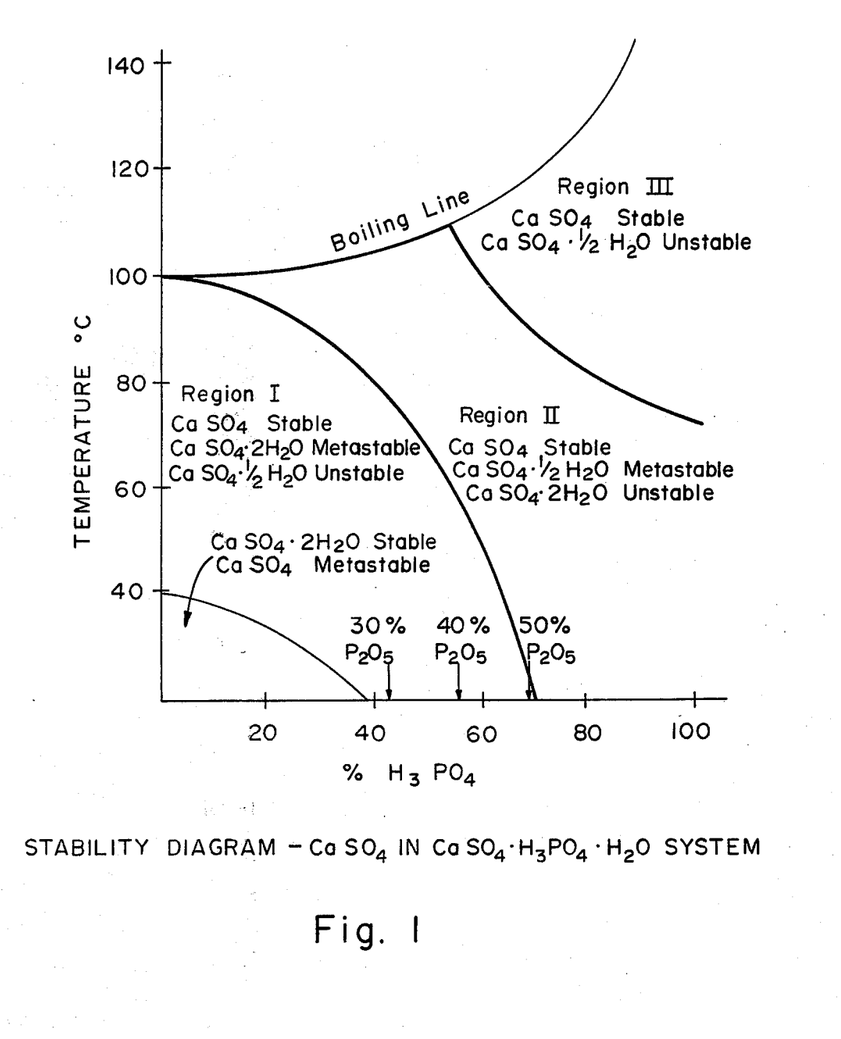
FIG. 1 is a plot derived from information in *Phosphoric Acid*, Vol. 1, Part 1 edited by A. V. Slack of phosphoric acid concentrations (in the further presence of approximately 1.5% sulfuric acid) versus temperature showing the states of hydration of the calcium sulfate, and the area of interest in the present invention (Region II) in heavier lines.

Broadly speaking, the present invention resides in modifying either the hemihydrate or the conventional dihydrate wet processes so as to obtain a small hemihydrate particle, as a finely grained particle in contrast to the conventional large, coarse particles by operating in Region II for less time, e.g. 10 minutes to 1 hour. A portion of the hemihydrate particles is converted to dihydrate in the presence of large proportions of coarser dihydrate seed crystals of calcium sulfate into very coarse, virtually radiation free calcium sulfate dihydrate (gypsum) particles in Region I. The fine hemihydrate contaminated with radioactive material is easily separated from the high purity, low radiation (e.g. less than 5 pCi/g of radium-226) coarse gypsum product. Surprisingly, an extremely high purity gypsum product, containing less than 1 pCi/g of radium-226, results.

DETAILED DESCRIPTION OF THE PREFERRED EMBODIMENTS

Referring to FIG. 1, it is theorized that all phosphoric acid wet processes are carried out under conditions wherein an insoluble anhydrite is the thermodynamically stable form of calcium sulfate. However, in most commercial wet processes the crystal states actually precipitated are the metastable varieties; the hemihydrate and dihydrate. In Region I, where most commercial processes operate, the dissolution of finely divided phosphate rock takes place through the dissolving action of phosphoric acid, and to some degree sulfuric acid. The calcium ion that is brought into solution in this region combines with sulfate ion to precipitate the unstable hemihydrate. It, in turn, dissolves and recrystallizes as the dihydrate, particularly if dihydrate seed crystals are available for surface precipitation. Above the practical 28-32% $P_2O_5$ concentrations and 75°-85° C. area in FIG. 1 for the dihydrate process, the calcium sulfate dihydrate becomes unstable and increasing amounts of the metastable hemihydrate are formed, especially if large amounts of hemihydrate seed crystals are present. The rate of calcium sulfate crystal growth is proportional to the supersaturation level of a high concentration of reacting calcium and sulfate ions. The solids deposited per unit of time is proportional to the available crystal surface area, or for a given crystal seed, its specific surface; a high temperature; and a low water content in the slurry (i.e., a high $P_2O_5$ phosphoric acid concentration). The rate of precipitation is dependent upon the temperature, solution agitation, specific surface of seed crystal, solids content of the mixture, sulfuric acid concentration, and the time allowed for phosphate rock acidulation and hemihydrate recrystallization.

HEMIHYDRATE PROCESS EMBODIMENT

Figure 2:
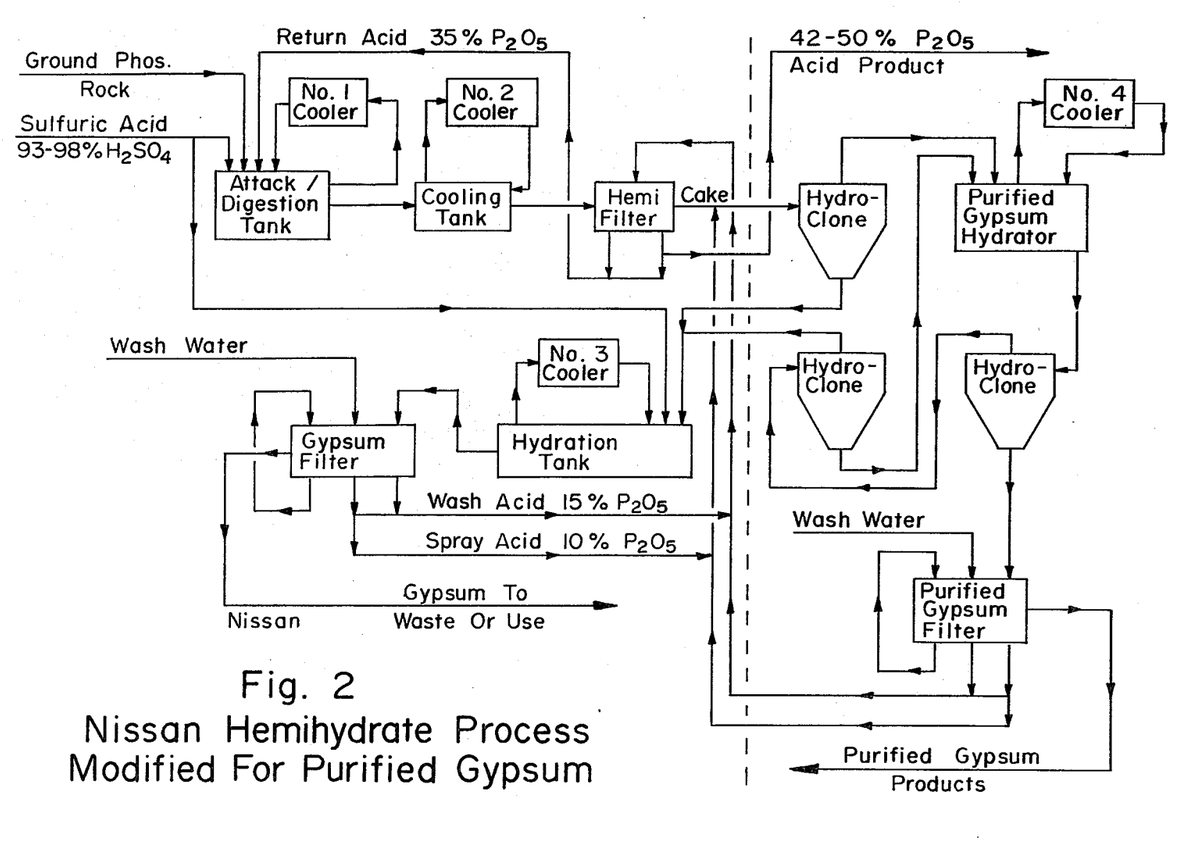
FIG. 2 is a labelled flow sheet diagrammatically illustrating the various vessels, all of which are conventional, employed in a preferred form of the process applied to a modified Nissan process.

In one preferred embodiment, a Nissan hemihydrate process is modified as shown in FIG. 2, the steps and conditions to the left of the vertical dotted lines being generally conventional in operation of the Nissan process, producing phosphoric acid product having a $P_2O_5$ content of about 42-50%. In the digestion attack zone, as shown in FIG. 2, generally from about 2-10 mixing cells are utilized for a slurry of about 20-50% solids. At substantially lower solids content, more phosphate ion is co-precipitated with the calcium sulfate, causing phosphate loss in the process; while substantially above 50% solids, the slurry is difficult to mix. The attack/digestion zone should be operated at a temperaure between 60° C. and 110° C. preferably 80° C. and 110° C., preferably about 95° C. At substantially lower i.e. below 80° C. temperatures, increased cooling capacity is needed and sufficient phosphogypsum may be formed to interfere with the process; while temperatures substantially higher are undesirable as requiring additional heat to maintain the reaction. Further, the slurry will have in the attack zone about 1-4% with about 1.5-2% being optimum, sulfuric acid concentration in excess over stoichiometric (excess, or free sulfuric); and about 62-73% total phosphoric acid and sulfuric acid contents combined as shown in FIG. 2. At total acid concentration below about a combined total of 43% $P_2O_5$ and 4% free sulfuric acid, free water becomes available for phosphogypsum formation and tends to move the operation too far toward Region I of FIG. 1; while above a combined total of about 50% $P_2O_5$ and 1.5% free sulfuric acid, viscosity becomes sufficiently high that increasing amounts of phosphate ion are co-precipitated with the hemihydrate causing phosphate losses in the process. After digestion, the hemihydrate phosphoric acid slurry is filtered to give a 42-50% $P_2O_5$ phosphoric acid and a hemihydrate filter cake.

In accordance with the present invention, the hemihydrate filter cake is re-slurried with an about 10-30%, with 10-23% being prepared, $P_2O_5$ (e.g. filtrate) and optionally passed through a first hydroclone to remove silica sands and any large particles of hemihydrate e.g., greater than about 30 micrometers average particle diameter. The oversize hemihydrate particles may be sent to the conventional hydration station, which now becomes a waste product hydrator for processing waste material to disposal. The fine particle hemihydrate phosphoric acid slurry, and optionally 1-4% free sulfuric acid, is transferred to the purified gyspum hydrator; where it is mixed with a recycle stream of purified gypsum seed crystals for conversion of the hemihydrate to gypsum and for crystal growth. The hydrator is operated preferably at about 60° C., more generally about 55° to 80° C. The recycle gypsum seed crystals are metered in to provide preferred weight ratios of about 1-4:1 of fine hemihydrate particles:coarse gypsum seed crystals. After approximately 25% to 50% of the hemihydrate has been converted to gypsum of greater than 50 micrometers size (in about 10-60 minutes) the slurry is passed through a second hydroclone to remove the purified gypsum product. Considerable small gypsum may be generated during recycling and carried along for total hemihydrate to gyspum conversions of 60-90% without affecting purification. The recovered gypsum will be large acicular particles with diameters that may range from 50-100 micrometers or more. The purified gypsum product is filtered, washed and dried. The overflow from the second hydroclone is passed through a third hydroclone where smaller sized gypsum crystals (such as about 30 to 50 micrometers) are recycled to the purified gypsum hydrator to act as a new source of gypsum seed crystals. The overflow from the third hydroclone containing the radioactive radium-226 is passed to the "conventional" hydration station, where it is converted to a waste gypsum product, filtered, washed and passed to disposal.

EXAMPLE 1

In accord with the modified Nissan process diagrammed in FIG. 2, ground phosphate rock and 60% sulfuric acid were metered with a recycle stream to obtain a 45% $P_2O_5$ (62.1% $H_3PO_4$) phosphoric acid and 1.5% excess sulfuric acid reaction mixture at slightly above 95° C. to produce a hemihydrate slurry. Ten minutes after they were added, the slurry was screened through two stainless steel sieves with 0.42 millimeter (420 micrometers or 40 U.S. Standard mesh) and 0.05 millimeter (53 micrometers or 270 U.S. Standard mesh)

openings to remove silica sand of +40 mesh, and unreacted phosphate rock and coarse particles of hemihydrate of +270 mesh.

The fine fraction, smaller than 53 micrometers, was washed into a hydration tank containing purified gypsum seed crystals (greater than 53 micrometers size and in about 1.5:1 weight ratio of hemihydrate to gypsum seed) with wash water proportioned to give a hydration solution containing 15% $P_2O_5$ and 1.5% $H_2SO_4$.

The mixture was agitated with a motor driven stirrer at 60° C. for 1 hour for 76% total conversion of coarse +270 mesh and fine −270 mesh hemihydrate to gypsum, as analyzed by Differential Scanning Calorimeter Thermogravimetric Analysis (DSC-TGA). At this time the reaction was quenched with 2 volumes of 2-propanol and the mixture screened through a 53 micrometer screen to remove the coarse purified gypsum product. The purified gypsum product, when washed with alcohol and acetone and dried at 40° C., showed by X-ray diffraction analysis to be essentially all gypsum with only trace amounts of hemihydrate.

Figure 4A:
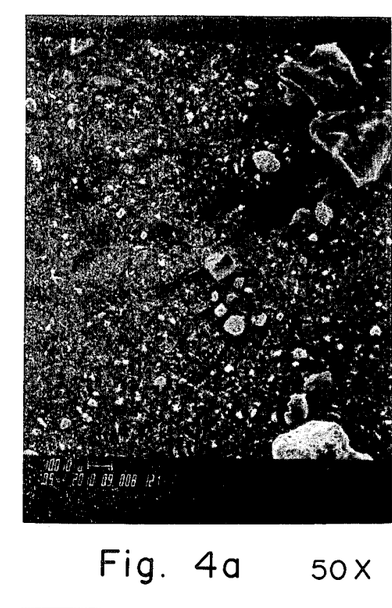
FIGS. 4a and b are scanning electron microphotographs at different magnifications of phosphohemihydrate produced by the present invention.
Figure 4B:
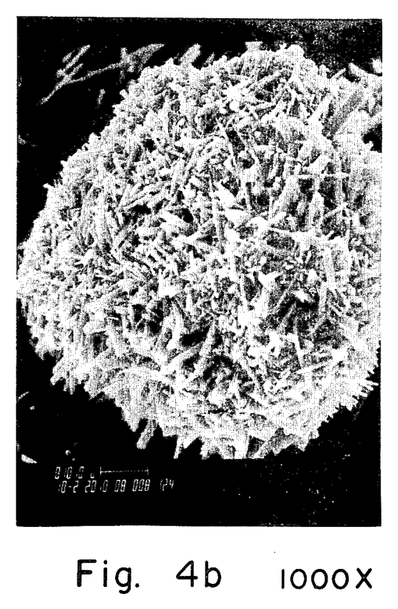
Figure 5A:
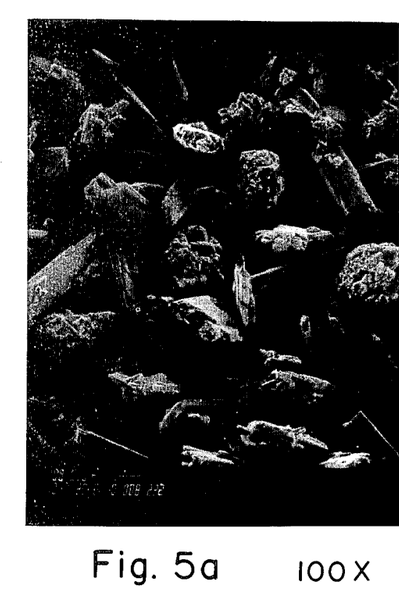
FIGS. 5a and b are scanning electron microphotographs at different magnifications of purified gypsum produced by the present invention.
Figure 5B:
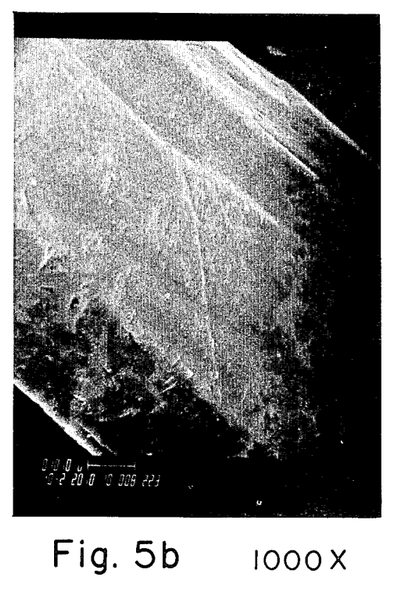

The hemihydrate obtained in the digestion stage and the coarse purified gypsum product were submitted to scanning electron microscopic examination, as shown in FIGS. 4 and 5. The relative particle sizes of the fine hemihydrate feed (FIGS. 4a and b) to the coarse purified gypsum (FIGS. 5a and 5b) is readily apparent. It is noted that FIG. 5b shows that the coarse purified gypsum product is virtually free of any dusting or sticking of contaminated unrehydrated hemihydrate. By control of the process parameters and apparently the inherent physical chemistry properties of the formed alpha hemihydrate particle, extremely clean separation of coarse purified gypsum from the contaminated hemihydrate is occurring.

Samples of the hemihydrate feed, purified gypsum product and waste fine hemihydrate were submitted to radioactivity determinations. The coarse purified gypsum product was found to contain less than 0.5 pCi/g of radium-226 calculated as an average of the 0.295, 0.352 and 0.609 MEV peaks of its lead-214 and bismuth-214 short lived progeny. These were measured at three weeks evaluation in equilibrium with the long-lived radium-226 precursor in the samples. Full analysis of the three week exposure sample was as follows:

| | |
|---|---|
| Gross Alpha | 0 ± 5 pCi/gram |
| Gross Beta | 18 ± 4 pCi/gram |
| Ge(Li) Scan (MeV): | |
| $^{40}K$ (1.462) | 0 ± 2 pCi/gram |
| $^{214}Bi$ (0.609) | 0.4 ± 0.2 pCi/gram |
| $^{214}Pb$ (0.352) | 0.5 ± 0.2 pCi/gram |
| $^{226}Ra$ (0.186) | 0.9 ± 0.3 pCi/gram |

This is a very considerable reduction in radioactivity for the product. The hemihydrate feed was found to contain an averaged 30 pCi/g radium-226, with full analyses as follows:

| | |
|---|---|
| Gross Alpha | 400 ± 20 pCi/gram |
| Gross Beta | 210 ± 10 pCi/gram |
| Ge(Li) Scan (Mev): | |
| $^{40}K$ (1.462) | 0 ± 2 |
| $^{214}Bi$ (1.120) | 32 ± 2 |
| $^{214}Bi$ (0.768) | 29 ± 3 |
| $^{214}Bi$ (0.609) | 28 ± 1 |
| $^{214}Pb$ (0.352) | 29 ± 1 |
| $^{214}Pb$ (0.295) | 33 ± 2 |
| $^{214}Pb$ (0.242) | 35 ± 5 |
| $^{226}Ra$ (0.186) | 23 ± 7 | and the fine waste fraction contained an averaged 50 pCi/g radium-226, with analyses as follows:

| | |
|---|---|
| Gross Alpha | 310 ± 20 pCi/gram |
| Gross Beta | 290 ± 10 |
| Ge(Li) Scan (MeV): | |
| $^{40}K$ (1.462) | 0 ± 2 |
| $^{214}Bi$ (1.120) | 52 ± 3 |
| $^{214}Bi$ (0.768) | 50 ± 3 |
| $^{214}Bi$ (0.609) | 47 ± 2 |
| $^{214}Pb$ (0.352) | 50 ± 2 |
| $^{214}Pb$ (0.295) | 52 ± 3 |
| $^{214}Pb$ (0.242) | 52 ± 2 |
| $^{226}Ra$ (0.186) | 51 ± 6 |

DIHYDRATE PROCESS EMBODIMENT

In the second preferred embodiment, this process can be modified so that it can be used with conventional Prayon process for producing 30% $P_2O_5$ phosphoric acid. The basic modification is to operate the first attack tank at about 80°–105° C. to produce in it an about 30% $P_2O_5$ phosphoric acid slurry and hemihydrate instead of the conventional phosphogypsum. As set forth in FIG. 3, a 30% $P_2O_5$ phosphoric acid slurry is extracted from the first digestion attack tank, and passed through a first hydroclone. The underflow, containing unreacted phosphate rock, silica sand and coarse particle size hemihydrate is passed back into the second digestion attack tank to continue on in the conventional Prayon process. The fines fraction of hemihydrate obtained from the first attack tank is passed to the gypsum hydrator for conversion to gypsum and crystal growth on the purified gypsum seed crystals at about 55°–80° C. Desirably, the product slurry is removed from the hydrator after about 25%–75%, preferably 50% conversion. The product slurry is sent from the hydrator to a second cyclone to remove, as an underflow, the purified gypsum product which is filtered and washed. The overflow from the second hydroclone is passed to a third hydroclone for separation into a smaller purified gypsum seed for recycle and to unreacted hemihydrate for return to the second attack tank.

EXAMPLE 2

Figure 3:
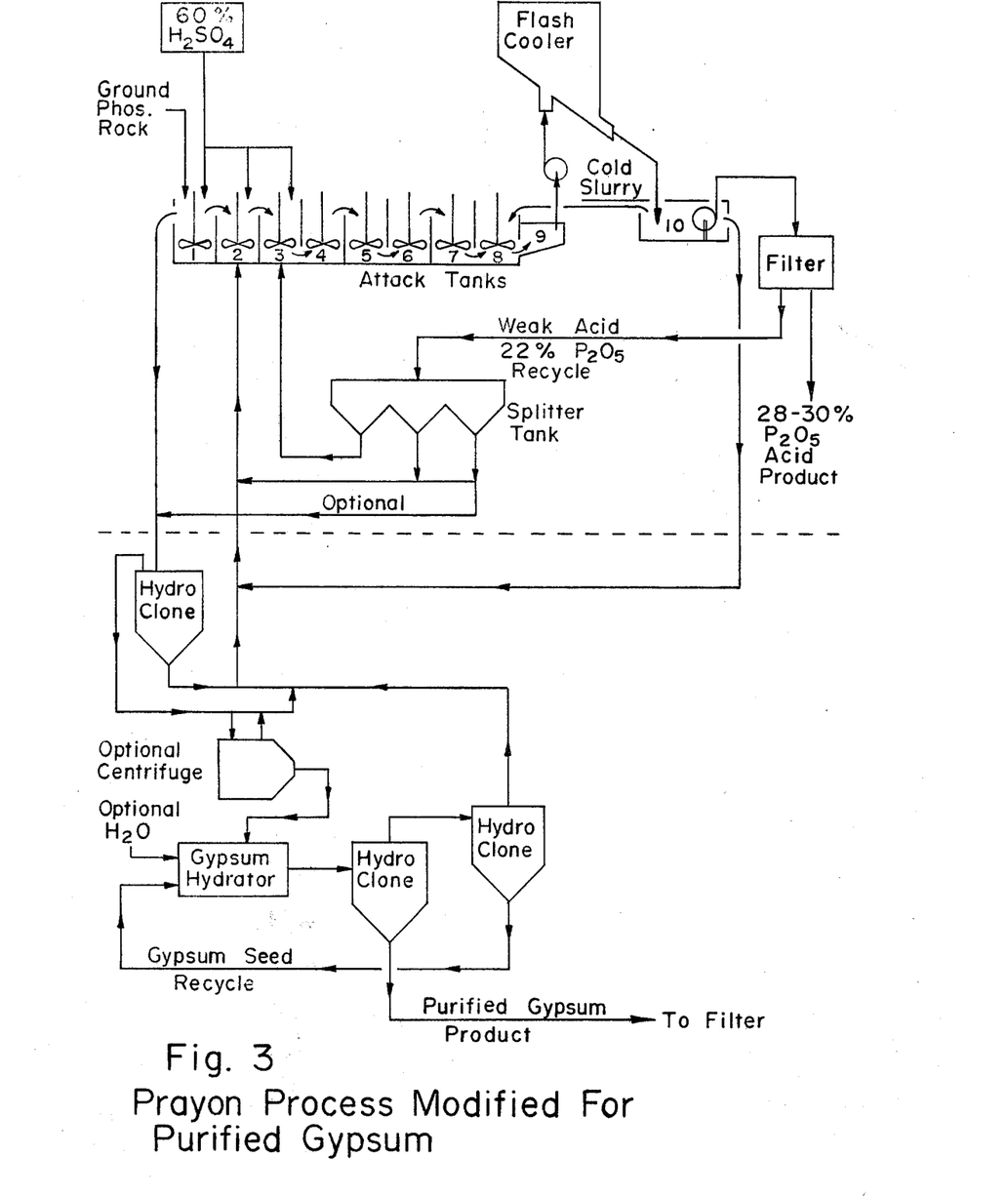
FIG. 3 is a corresponding labelled flow sheet diagrammatically illustrating a second preferred form of the process applied to a modified Prayon process.

In accord with the modified Prayon process diagrammed in FIG. 3, recycle acid, ground phosphate rock and 60% sulfuric acid can be metered into a 30% $P_2O_5$ (42% $H_3PO_4$) phosphoric acid solution containing 1.5% excess sulfuric acid; and the slurry held at above 95° C. to precipitate calcium sulfate as hemihydrate. In this example, ten minutes after the last metered additions, a portion of the slurry was withdrawn to form a mixture of 30% $P_2O_5$ phosphoric acid containing 1.5% sulfuric acid and gypsum seed crystals (coarser than 200 U.S. Standard mesh, greater than 74 micrometers) in the gypsum hydrator as shown in FIG. 3. The resulting slurry was stirred for ½ hour at 60° C. to allow about 50% of the hemihydrate to convert to gypsum and precipitate on the gypsum seed crystals. The initial ratio of hemihydrate to gypsum seed crystals in the gypsum hydrator was 2:1 by weight. At this time the reaction was quenched with 3 volumes of 2-propanol filtered, washed with acetone and dried at 40° C. The dried product was screened to give a purified gypsum product between 100 and 200 mesh (74–150 micrometers) average diameter of acicular particles. The purified gypsum product was analyzed by DSC-TGA and did not show any unreacted hemihydrate. The waste product was screened to a fine fraction passing 53 micrometers that showed a mixture of 33% hemihydrate and 65% gypsum. Scanning electron microphotographs of the feed hemihydrate and coarse purified gypsum product respectively showed considerable surface dusting of fine hemihydrate on the ostensibly purified gypsum product. Radiation analysis of this product showed it to be higher in retained radium-226, when the recrystallization was in 30% $P_2O_5$ slurry in comparison to the material recovered in Example 3, with analyses as follows:

| | |
|---|---|
| Gross Alpha | 60 ± 10 pCi/gram |
| Gross Beta | 65 ± 7 |
| Ge(Li) Scan (MeV): | |
| $^{40}K$ (1.462) | 0 ± 1 |
| $^{214}Bi$ (1.120) | 7.3 ± 0.5 |
| $^{214}Bi$ (0.768) | 8 ± 1 |
| $^{214}Bi$ (0.609) | 6.9 ± 0.3 |
| $^{214}Pb$ (0.352) | 6.0 ± 0.3 |
| $^{214}Pb$ (0.295) | 7.1 ± 0.4 |
| $^{214}Pb$ (0.242) | 5 ± 1 |
| $^{226}Ra$ (0.186) | 5 ± 3 |

EXAMPLE 3

As a further optional embodiment, the Prayon process of FIG. 3 can be further modified so that the 30% $P_2O_5$ phosphoric acid slurry extracted from digestion (attack tank No. 1) and the 22% $P_2O_5$ phosphoric acid returning to No. 2 and 3 digester tanks can be blended together for hydration. As shown in FIG. 3 the $P_2O_5$ phosphoric acid filtrate drawn from the product acid stream (weak acid recycle from filter) was blended with the slurry from attack tank 1, to obtain a 23% $P_2O_5$ and 3% sulfuric acid slurry in the first hydroclone and passed directly into the gypsum hydrator. Gypsum seed was recycled to obtain a 2.5:1 weight ratio in the hydrator. The slurry was hydrated at 60° C. for 3 hours. Conversion of the hemihydrate in these lower $P_2O_5$ concentrations resulted in less phosphate impurity in the purified gypsum product. X-ray diffraction analysis showed the product to be virtually all dihydrate with only trace amounts of alpha quartz and hemihydrate. Radiation analysis was as follows:

| | |
|---|---|
| +270 mesh prehydration hemihydrate: | |
| Gross Alpha | 310 ± 20 pCi/gram |
| Gross Beta | 240 ± 10 |
| Ge(Li) Scan (MeV): | |
| $^{40}K$ (1.462) | 0 ± 3 |
| $^{214}Bi$ (1.120) | 24 ± 1 |
| $^{214}Bi$ (0.768) | 21 ± 2 |
| $^{214}Bi$ (0.609) | 24 ± 1 |
| $^{214}Bi$ (0.352) | 27 ± 1 |
| $^{214}Pb$ (0.295) | 27 ± 1 |
| $^{214}Pb$ (0.242) | 28 ± 1 |
| $^{226}Ra$ (0.186) | 34 ± 6 |
| +270 mesh product | |
| Gross Alpha | 7 ± 4 pCi/gram |
| Gross Beta | 17 ± 4 |
| Ge(Li) Scan (MeV): | |
| $^{40}K$ (1.462) | 0 ± 1 |
| $^{214}Bi$ (1.120) | 2.7 ± 0.2 |
| $^{214}Bi$ (0.768) | 2.5 ± 0.5 |
| $^{214}Bi$ (0.609) | 2.3 ± 0.1 |
| $^{214}Pb$ (0.352) | 2.5 ± 0.1 |
| $^{214}Pb$ (0.295) | 2.3 ± 0.1 |
| $^{214}Pb$ (0.242) | 2.6 ± 0.1 |
| $^{226}Ra$ (0.186) | 3.5 ± 0.2 |
| Hydrated −270 mesh waste material | |
| Gross Alpha | 150 ± 10 |
| Gross Beta | 170 ± 10 |
| Ge(Li) Scan (MeV): | |
| $^{40}K$ (1.462) | 0 ± 8 |
| $^{214}Bi$ (1.120) | 44 ± 3 |
| $^{214}Bi$ (0.768) | 43 ± 5 |
| $^{214}Bi$ (0.609) | 42 ± 2 |
| $^{214}Pb$ (0.352) | 45 ± 2 |
| $^{214}Pb$ (0.295) | 44 ± 2 |
| $^{214}Pb$ (0.242) | 43 ± 2 |
| $^{226}Ra$ (0.186) | 48 ± 6 |

EXAMPLE 4

The process as set forth in Example 3 was repeated except that the slurry from the first hydroclone was centrifuged to concentrate the hemihydrate solids entering the hydrator and water was added to the hydrator to obtain a 15% $P_2O_5$ and 1.5% sulfuric acid slurry in the hydrator. The water to be added could be wash water from the purified gypsum filter not shown. Gypsum seed was recycled in a weight ratio of 2.5:1 in the hydrator. The slurry was hydrated at 60° C. for 1 hour. Conversion of the hemihydrate in these lower $P_2O_5$ concentrations resulted in less phosphate impurity in the purified gypsum product. X-ray diffraction analysis showed the product to be all dihydrate with a trace of hemihydrate. Radiation analysis was as follows:

| | |
|---|---|
| +53 micrometer fraction of prehydration hemihydrate: | |
| Gross Alpha | 180 ± 10 pCi/gram |
| Gross Beta | 220 ± 10 |
| Ge(Li) Scan (MeV): | |
| $^{40}K$ (1.462) | 0 ± 5 |
| $^{214}Bi$ (1.120) | 34 ± 2 |
| $^{214}Bi$ (0.768) | 37 ± 5 |
| $^{214}Bi$ (0.609) | 32 ± 2 |
| $^{214}Pb$ (0.352) | 33 ± 2 |
| $^{214}Pb$ (0.295) | 33 ± 2 |
| $^{214}Pb$ (0.242) | 30 ± 2 |
| $^{226}Ra$ (0.186) | 30 ± 10 |
| +53 micrometer fraction of desired hydrated product: | |
| Gross Alpha | 5 + 2 pCi/gram |
| Gross Beta | 11 ± 4 |
| Ge(Li) Scan (MeV): | |
| $^{40}K$ (1.462) | 0 ± 1 |
| $^{214}Bi$ (1.120) | 0.5 ± 0.3 |
| $^{214}Bi$ (0.768) | 0 ± 1 |
| $^{214}Bi$ (0.609) | 0.4 ± 0.1 |
| $^{214}Pb$ (0.352) | 0.4 ± 0.1 |
| $^{214}Pb$ (0.295) | 0.4 ± 0.1 |
| $^{214}Pb$ (0.242) | 0.4 ± 0.1 |
| $^{226}Ra$ (0.186) | 0 ± 1 |
| −53 micrometer fraction of hydrated waste product | |
| Gross Alpha | 260 ± 20 pCi/gram |
| Gross Beta | 290 ± 10 |
| Ge(Li) Scan (MeV): | |
| $^{40}K$ (1.462) | 0 ± 3 |
| $^{214}Bi$ (1.120) | 66 ± 3 |
| $^{214}Bi$ (0.768) | 62 ± 3 |
| $^{214}Bi$ (0.609) | 65 ± 3 |
| $^{214}Pb$ (0.352) | 68 ± 3 |
| $^{214}Pb$ (0.295) | 68 ± 3 |
| $^{214}Pb$ (0.242) | 69 ± 3 |
| $^{226}Ra$ (0.186) | 80 ± 8 |

In this evaluation highly effective radiation reduction was accomplished. The desired product portion of hydrated material had, within error limitations at the time of analysis, 0.4 pCi/g of radium-226 calculated as an average of the 0.295, 0.352 and 0.609 MEV values for the daughter products of radium-226 whereas the waste fraction contained 67 pCi/g of radium-226. It is noted in comparing this evaluation to the immediately preceeding ones that as the phosphoric acid concentration decreased in the hydrating steps from 30% to 23% to 15% the radium-226 count in the desired coarse hydrated fraction correspondingly decreased in greater than lineal fashion, e.g., about 7, about 2.4 and 0.4 pCi/g.

It will be appreciated from the foregoing description of preferred embodiments that various further modifications may be made within the scope of the invention. For example, the radioactivity may be further concentrated in the waste portion and the proportion of hemihydrate converted to purified gypsum increased, such as by sequentially repeating the hydration step. Thus the −53 micrometer waste fraction may be mixed with additional gypsum seed and dilute phosphoric acid to hydrate a further portion of the hemihydrate to purified gypsum and further concentrate the radiation in smaller amounts of smaller sized unhydrated hemihydrate. On sequential partial hydrations microhydrocyclones that separate particle sizes of 1-10 micrometers may be substituted for the regular hydrocyclones. In this manner total conversions of hemihydrate to purified dihydrate on the order of 90-99% may be achieved and the waste portion may be composed of 1-10 micrometer particles.

What is claimed is:

1. A process for reducing radioactivity in calcium sulfate containing radioactive contamination comprising the steps of:
    forming an acidic aqueous slurry of fine sized phosphohemihydrate containing radioactive contamination and a substantial weight proportion of coarser particles of gypsum that are substantially free of radioactivity;
    hydrating, at a temperature and $P_2O_5$ concentration of phosphoric acid with Region I of FIG. 1, at least a substantial proportion, but less than all, of the hemihydrate to coarser gypsum substantially free of radioactivity; and
    separating a coarse gypsum product low in radioactivity from the finer sized hemihydrate containing radioactive contamination.

2. The process of claim 1 wherein the phosphohemihydrate is hydrated to convert up to 99% of the hemihydrate to gypsum substantially free of radioactivity.

3. The process of claim 1 wherein the phosphohemihydrate is hydrated to convert about 25% to about 75% of the hemihydrate to gypsum substantially free of radioactivity.

4. The process of claim 1 wherein the phosphohemihydrate containing radioactive contamination is mixed with gypsum substantially free of radioactivity in weight proportions of about 1:1 to about 4:1 of hemihydrate to gypsum; and about 25% to about 50% of the phosphohemihydrate is hydrated to gypsum substantially free of radioactivity.

5. The process of claim 1 wherein the hydration is at a temperature between 55° and 80° C.

6. The process of claim 1 wherein the hydration is at a temperature of about 60° C.

7. The process of claim 1 further including the steps of separating the coarse gypsum product into a portion of less than 50 micrometers particle size; and recycling the portion that is less than 50 micrometers particle size for mixing with additional fine phosphohemihydrate containing radioactive contamination.

8. The process of claim 1 wherein a coarse gypsum product containing less than 5 pCi/g of radium-226 is separated.

9. The process of claim 1 wherein a coarse gypsum product containing less than 1 pCi/g of radium-226 is separated.

10. A wet process of the hemihydrate type for producing phosphoric acid and calcium sulfate from phosphate rock wherein the calcium sulfate is formed as calcium sulfate hemihydrate, characterized in producing a calcium sulfate of reduced radioactivity, which comprises:
    continuously feeding finely divided phosphate rock, sulfuric acid, phosphoric acid, water and calcium sulfate hemihydrate to a mixing zone and mixing them to form a slurry;
    the quantities charged to the mixing zone being such as to provide a slurry comprising about 20-50% by weight total solids, about 62-73% total phosphoric acid and sulfuric acid content, with about 1-4% by weight being sulfuric acid and, mixing at a time and temperature between about 60°-110° C. producing small hemihydrate particles;
    continuously withdrawing a leach slurry from said mixing zone and passing it to a first filtering separation zone to separate strong phosphoric acid and calcium sulfate hemihydrate containing radioactive contamination;
    recovering a strong phosphoric acid from the first separation zone;
    recovering calcium sulfate hemihydrate containing radioactive contamination from the first separation zone and mixing it with phosphoric acid of about 10-30% $P_2O_5$ and coarse gypsum particles that are substantially free of radioactivity to form a slurry having a substantial weight proportion of gypsum particles to the weight of hemihydrate containing radioactive contamination;
    hydrating at a temperature of about 55°-80° C. and phosphoric acid concentration selected so as to be within Region I of FIG. 1, a substantial proportion, but not all, of the hemihydrate containing radioactive contamination to purified gypsum particles of greater particle size than the hemihydrate; and
    passing the hydration slurry to a second filtering separation zone to a separate a coarse purified gypsum that is substantially free of radioactivity from fine sized hemihydrate containing radioactive contamination.

11. The process of claim 10 wherein a coarse gypsum product containing less than 5 pCi/g of radium-226 is separated.

12. The process of claim 10 wherein a coarse gypsum product containing less than 1 pCi/g of radium-226 is separated.

13. The process of claim 10 wherein the hemihydrate is hydrated at a temperature of about 60° C.

14. The process of claim 10 further including the steps of separating the coarse gypsum product into a portion of less than 50 micrometers particle size and a portion greater than 50 micrometers particle size; recovering purified gypsum particles of greater than 50 micrometers particle size; and recycling the portion that is less than 50 micrometers particle size for mixing with fine phosphohemihydrate containing radioactive contamination.

15. A dihydrate wet process for producing phosphoric acid and calcium sulfate from phosphate rock of the type precipitating the calcium sulfate as phosphogypsum containing radioactive contamination, the improvement which comprises the steps of:

operating one attack tank in the attack zone in the conventional dihydrate process for digestion of phosphate rock at a temperature and phosphoric acid concentration selected so as to be within Region II of FIG. 1 and at a time so as to produce small calcium sulfate hemihydrate particles; and     withdrawing therefrom a phosphoric acid slurry containing calcium sulfate precipitated as calcium sulfate hemihydrate;

sending the slurry to a first separator zone;

recovering an about 30% $P_2O_5$ phosphoric acid from the first separation zone;

recovering calcium sulfate hemihydrate from the first separation zone and mixing it with phosphoric acid of about 10–30% $P_2O_5$ and coarse gypsum particles that are substantially free of radioactivity to form a slurry having a substantial weight proportion of coarse gypsum particles to the weight of hemihydrate containing radioactive contamination;

at a temperature and phosphoric acid concentration selected so as to be within Region I of FIG. 1, hydrating a substantial proportion, but not all, of the hemihydrate containing radioactive contamination to purified gypsum particles of greater particle size than the hemihydrate; and     passing the hydration slurry to a second filtering separation zone to separate a coarse purified gypsum that is substantially free of radioactivity from fine sized hemihydrate containing radioactive contamination.

16. The process of claim 15 wherein a coarse gypsum product containing less than 5 pCi/g of radium-226 is separated.

17. The process of claim 15 wherein a coarse gypsum product containing less than 1 pCi/g of radium-226 is separated.

18. The process of claim 15 wherein the attack tank is operated at a temperature of about 80°–105° C.

19. The process of claim 15 wherein the hemihydrate is hydrated at a temperature of about 55°–80° C.

20. The process of claim 15 further including the steps of separating the coarse gypsum product into a portion of less than 50 micrometers particle size and a portion greater than 50 micrometers particle size; recovering purified gypsum particles of greater than 50 micrometers particle size; and recycling the portion that is less than 50 micrometers particle size for mixing with fine phosphohemihydrate containing radioactive contamination.

* * * * *